(12) United States Patent
Kitsukawa et al.

(10) Patent No.: US 9,512,843 B2
(45) Date of Patent: Dec. 6, 2016

(54) TURBOCHARGER SYSTEM

(75) Inventors: Isao Kitsukawa, Fujisawa (JP);
Tomohiro Sugano, Fujisawa (JP);
Yoshiyuki Abe, Fujisawa (JP); Haruyo Kimura, Fujisawa (JP); Akira Iijima,
Fujisawa (JP); Naoki Ishibashi,
Fujisawa (JP); Syougo Sakashita,
Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 388 days.

(21) Appl. No.: 13/882,065

(22) PCT Filed: Oct. 26, 2011

(86) PCT No.: PCT/JP2011/074652
§ 371 (c)(1),
(2), (4) Date: Apr. 26, 2013

(87) PCT Pub. No.: WO2012/057190
PCT Pub. Date: May 3, 2012

(65) Prior Publication Data
US 2013/0216408 A1    Aug. 22, 2013

(30) Foreign Application Priority Data

Oct. 29, 2010    (JP) .................................. 2010-244385

(51) Int. Cl.
*F02B 33/44* (2006.01)
*F04D 13/06* (2006.01)
(Continued)

(52) U.S. Cl.
CPC .............. *F04D 13/06* (2013.01); *F02B 37/10* (2013.01); *F02B 39/10* (2013.01); *F02D 23/00* (2013.01);
(Continued)

(58) Field of Classification Search
CPC ...... F02B 37/005; F02B 37/14; Y02T 10/144; Y02T 10/42; F02D 23/00; F02D 41/0002; F02D 41/0007
(Continued)

(56) References Cited

U.S. PATENT DOCUMENTS

2003/0005695 A1* 1/2003 Allen et al. ..................... 60/608
2003/0019212 A1* 1/2003 Baeuerle ............. F02D 13/0261
60/608
(Continued)

FOREIGN PATENT DOCUMENTS

JP        11-514064       11/1999
JP        2005-188483      7/2005
(Continued)

OTHER PUBLICATIONS

WIPO PatentScope Abstract, Publication No. WO/1997/015753, Published May 1, 1997.
(Continued)

*Primary Examiner* — Thomas Denion
*Assistant Examiner* — Thomas Olszewski
(74) *Attorney, Agent, or Firm* — Staas & Halsey LLP

(57) ABSTRACT

A turbocharger system for achieving both improvement of fuel efficiency by engine downsizing and excellent shock loading resistance. The system includes: a power-assisted turbocharger mounted on a vehicle having an accessory and including a turbine disposed on an exhaust passage of an engine and driven by exhaust, a compressor disposed on an intake passage and driven by a rotational torque of the turbine, and an electric motor that assists a drive force of the compressor; and an electric motor control unit that drives the electric motor when the accessory is being driven.

4 Claims, 2 Drawing Sheets

(51) Int. Cl.
  *F02B 37/10*  (2006.01)
  *F02B 39/10*  (2006.01)
  *F02D 23/00*  (2006.01)
(52) U.S. Cl.
  CPC ............ *F02M 26/05* (2016.02); *F02M 26/23* (2016.02); *Y02T 10/121* (2013.01); *Y02T 10/144* (2013.01)
(58) Field of Classification Search
  USPC ......... 60/600, 607, 608, 597, 39.08; 290/52; 180/170; 701/102, 103
  See application file for complete search history.

(56) References Cited

U.S. PATENT DOCUMENTS

| | | | |
|---|---|---|---|
| 2004/0011018 A1* | 1/2004 | Bouiller et al. | 60/39.08 |
| 2005/0000217 A1* | 1/2005 | Nau | F01N 3/2006 60/612 |
| 2009/0183499 A1* | 7/2009 | Boorse | F01N 3/025 60/295 |
| 2009/0198432 A1* | 8/2009 | Tabata et al. | 701/103 |
| 2012/0137682 A1* | 6/2012 | Hatley et al. | 60/608 |

FOREIGN PATENT DOCUMENTS

| | | |
|---|---|---|
| JP | 2006-177171 | 7/2006 |
| JP | 2007-211634 | 8/2007 |
| JP | 2008-8188 | 1/2008 |
| JP | 2010-209735 | 9/2010 |

OTHER PUBLICATIONS

Patent Abstracts of Japan, Publication No. 2005-188483, Published Jul. 14, 2005.
Patent Abstracts of Japan, Publication No. 2006-177171, Published Jul. 6, 2006.
Patent Abstracts of Japan, Publication No. 2007-211634, Published Aug. 23, 2007.
Patent Abstracts of Japan, Publication No. 2008-008188, Published Jan. 17, 2008.
Patent Abstracts of Japan, Publication No. 2010-209735, Published Sep. 24, 2010.
Seiichi Ibaraki et al., "Development of the "Hybrid Turbo," an Electrically Assisted Turbocharger," Mitsubishi Heavy Industries Ltd. Technical Review, vol. 43, No. 3 (Sep. 2006) p. 36-40.
International Search Report of PCT/JP2011/074652 mailed Nov. 22, 2011.
Written Opinion of the International Searching Authority mailed Nov. 22, 2011 in corresponding International Application No. PCT/JP2011/074652.

* cited by examiner

TURBOCHARGER SYSTEM

CROSS REFERENCE TO RELATED APPLICATIONS

This application claims the foreign priority benefit of Japanese Application No. 2010-244385 filed Oct. 29, 2010, the contents of which are incorporated herein by reference, which serves as priority for PCT Application No. JP2011/074652 filed Oct. 26, 2011.

TECHNICAL FIELD

The present invention relates to a turbocharger system applied to vehicles in which a shock load is applied to an engine, such as construction machine vehicles.

BACKGROUND ART

Recently, for improving vehicle fuel efficiency and reducing $CO^2$ emission, the development of technology has been actively made to reduce an engine displacement (engine downsizing) and ensure power performance by a supercharging such as a turbocharger.

Since a turbocharger used in engine downsizing is driven by exhaust energy and has an inertia in a rotating body of a turbo, the turbocharger is characterized in that it is difficult to obtain a supercharging pressure (boost pressure) in a transient operation, as compared with a steady operation.

As illustrated in FIG. 2, even though the displacement is reduced by engine downsizing, an engine torque can be improved by mounting the turbocharger, achieving the same power performance as the large displacement engine. However, in a zone (zone surrounded by a dashed line in FIG. 2) where an engine speed is low, such as an idle operating zone, torque-up cannot be expected because exhaust energy is low and a turbocharger does not work.

Also, as illustrated in FIG. 3, in an engine system (solid line) whose displacement is reduced by engine downsizing, the generation of the engine torque is delayed by supercharging delay (called a turbo lag) of the turbocharger, as compared with a large displacement engine system (dashed line) that generates the same engine torque.

Also, as citation list information related to the invention of this application, there are Patent Documents 1 and 2 and Non-Patent Document 1.

PRIOR ART DOCUMENTS

Patent Documents

Patent Document 1: JP 2006-177171 A
Patent Document 2: JP 2010-209735 A

Non-Patent Document

Non-Patent Document 1: [Development of Power-Assisted Turbocharger "Hybrid Turbo"], IBARAKI Seiichi and four others, Mitsubishi Heavy Industries Technical Review, Vol. 43, No. 3, 2006, p. 36-40

Recently, even in construction machine vehicles, such as Yumbo or excavators, the improvement of fuel efficiency by engine downsizing is in progress.

However, in an engine system whose displacement is reduced by engine downsizing, there is a problem in that the ability to absorb torque variation is degraded and the shock loading resistance is deteriorated, as compared with a conventional engine system having a large displacement.

For example, in the engine system whose displacement is reduced by engine downsizing, when a shock load (shock torque) is applied to the engine by collision of the shovel against the ground in the excavator, or the like, oxygen supplied to the engine becomes deficient because the increase in the boost pressure is delayed due to the turbo lag. Therefore, sufficient torque cannot be generated by the engine, and the engine speed is rapidly slowed down, making it difficult to operate the shovel or the like.

Similarly, if a shock load is applied to a zone where an engine speed is low, such as an idle operating zone, sufficient torque cannot be generated by the engine, and the engine is stopped, making it difficult to operate the shovel or the like.

SUMMARY OF THE INVENTION

Therefore, an object of the present invention is to solve the above problems and provide a turbocharger system capable of achieving both improvement of fuel efficiency by engine downsizing and excellent shock loading resistance.

The present invention has been made to achieve the above object, and provides a turbocharger system including: a power-assisted turbocharger mounted on a vehicle having an accessory and including a turbine disposed on an exhaust passage of an engine and driven by exhaust, a compressor disposed on an intake passage and driven by a rotational torque of the turbine, and an electric motor that assists a drive force of the compressor; and an electric motor control unit that drives the electric motor when the accessory is being driven.

The electric motor control unit may drive the electric motor when a switch configured to drive the accessory is on.

The electric motor control unit may drive the electric motor when an operating unit configured to operate the accessory is on.

The electric motor control unit may drive the electric motor at a rotational speed corresponding to an engine speed.

According to the present invention, it is possible to provide a turbocharger system capable of achieving both improvement of fuel efficiency by engine downsizing and excellent shock loading resistance.

DETAILED DESCRIPTION

Hereinafter, embodiments of the present invention will be described with reference to the accompanying drawings.

Figure 1:
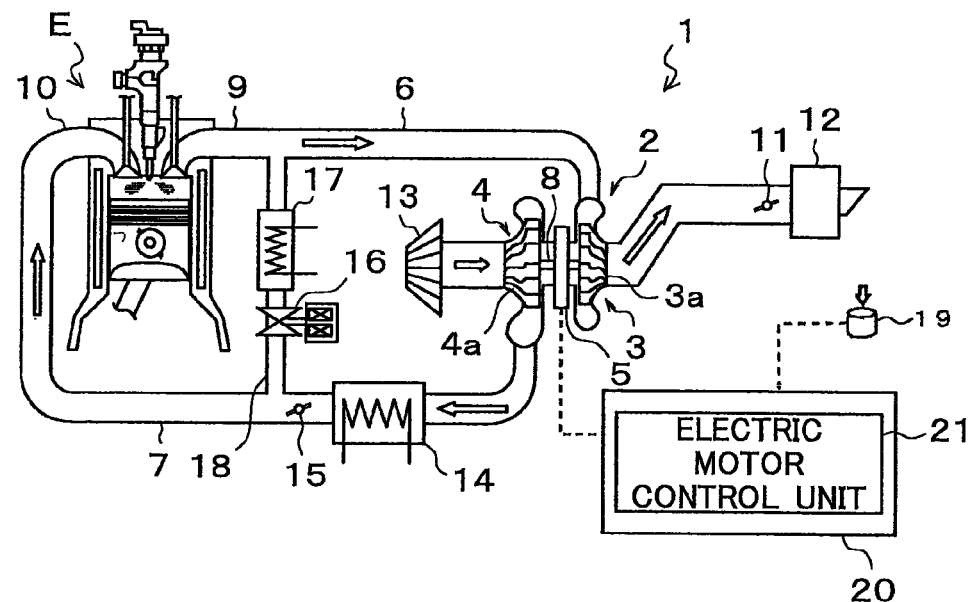
FIG. 1 is a schematic configuration diagram of an engine system using a turbocharger system according to an embodiment of the present invention.
Figure 2:
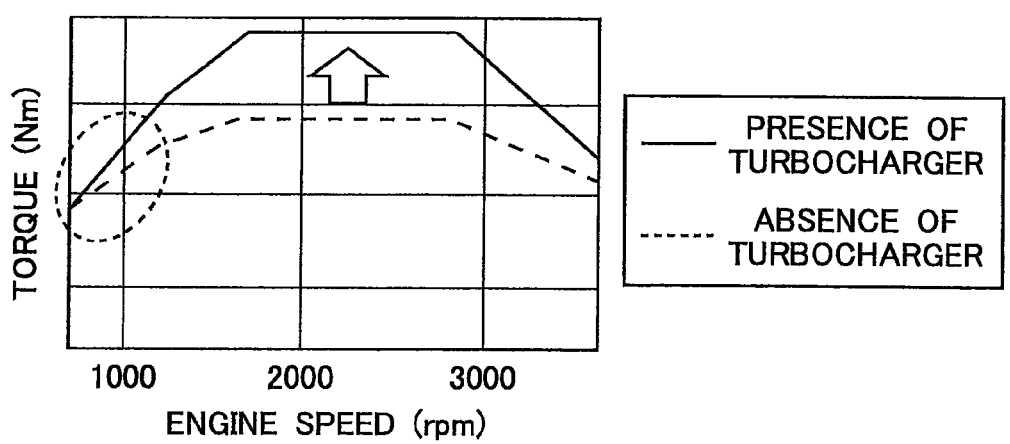
FIG. 2 is a diagram illustrating a relationship of an engine torque with respect to an engine speed in a conventional turbocharger system.
Figure 3:
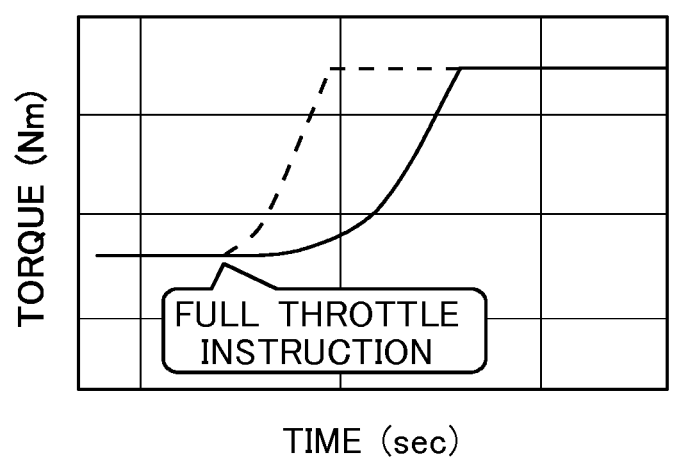
FIG. 3 is a diagram describing a turbo lag in a conventional turbocharger system.

FIG. 1 is a schematic configuration diagram of an engine system using a turbocharger system according to one embodiment.

Herein, a case where a vehicle mounted with the engine system of FIG. 1 is an excavator will be described. However, the present invention is not limited to the excavator, and can also be applied to any vehicle having an accessory driven by an engine, for example, other construction machines such as a Yumbo or bulldozer, a fire engine, a garbage truck, and the like.

As illustrated in FIG. 1, a turbocharger system 1 is provided with a power-assisted turbocharger (hybrid turbo) 2 including a turbine 3 disposed on an exhaust passage 6 of an engine E and driven by exhaust, a compressor 4 disposed on an intake passage 7 and driven by a rotational torque of the turbine 3, and an electric motor 5 assisting a drive force of the compressor 4 (assisting the rotational torque of the turbine 3).

The electric motor 5 of the power-assisted turbocharger 2 is integrally provided with a turbo shaft 8 that connects the turbine 3 and the compressor 4, more particularly, a turbine wheel 3a of the turbine 3 and a compressor wheel 4a of the compressor 4. The electric motor 5 is provided with, for example, a DC servomotor. Also, since the electric motor 5 is integrally provided with the turbo shaft 8, a rotational speed of the electric motor 5 is equal to a rotational speed (turbo rotational speed) of the power-assisted turbocharger 2. Hereinafter, the power-assisted turbocharger 2 will be simply referred to as the turbocharger 2.

The most upstream of the exhaust passage 6 is connected to an exhaust manifold 9 of the engine E. In the exhaust passage 6 of the downstream side, the turbine 3 of the turbocharger 2, an exhaust throttle 11, and an exhaust gas purifier 12 are provided in turn. The most downstream of the exhaust passage 6 is opened to the atmosphere.

In the most upstream of the intake passage 7, an air filter 13 is provided. In the intake passage 7 of the downstream side, the compressor 4 of the turbocharger 2, an intercooler (charge air cooler) 14, and an air supply throttle 15 are provided in turn. The most downstream of the intake passage 7 is connected to an intake manifold 10 of the engine E.

Also, the engine system performs exhaust gas recirculation ("EGR") control such that a part of exhaust gas discharged from the engine E is refluxed to the intake side. Specifically, an EGR pipe 18 is provided to connect the exhaust passage 6 of the upstream side of the turbine 3 and the intake passage 7 of the downstream side of the air supply throttle 15. The EGR pipe 18 is provided with an EGR valve 16 for adjusting an EGR amount (or EGR rate), which is an amount of exhaust gas refluxed to the intake side, and an EGR cooler 17 for cooling the exhaust gas refluxed to the intake side, respectively.

Also, the engine system is provided with a mode switch 19 as a switch that drives the accessory. Herein, the mode switch 19 is configured to be switchable between a travel mode (switch off) using no shovel and a shovel mode (switch on) using the shovel. Also, the mode switch 19 may use an existing switch, or a new switch may be provided to a vehicle having no the mode switch 19.

The turbocharger system 1 is provided with an electric motor control unit 21 that drives the electric motor 5 when the accessory is being driven. That is, when it is expected that a shock load (shock torque) will be applied to the engine E, the electric motor control unit 21 drives the electric motor 5 in advance. The electric motor control unit 21 is embedded into an electronic control unit (ECU) 20 as a program.

When the mode switch 19 is switched to the shovel mode (when the switch is on), work is performed using the shovel. Thus, it is expected that a shock load will be applied to the engine E. Therefore, when the mode switch 19 is switched to the shovel mode, the electric motor control unit 21 drives the electric motor 5.

Also, herein, although the electric motor control unit 21 is configured to drive the electric motor 5 when the mode switch 19 is on (shovel mode), it is not limited thereto and the electric motor 5 may be driven when an operating unit configured to operate the accessory (for example, an operating lever configured to operate the shovel) is operated. In this case, the electric motor 5 is driven when the operating lever is operated, and the electric motor 5 is stopped when predetermined time has elapsed after the operating lever is no longer operated.

Also, the electric motor control unit 21 drives the electric motor 5 at a rotational speed corresponding to an engine speed. Specifically, the electric motor control unit 21 includes a rotational speed map (not illustrated) in which the rotational speed of the electric motor 5 (that is, the rotational speed of the turbocharger 2) is set for each engine speed, and is configured to control a driving amount of the electric motor 5 (for example, to control a magnitude of a voltage applied to the electric motor 5) to become a rotational speed obtained with reference to the rotational speed map at the engine speed.

As described above, the turbocharger system 1 according to the present embodiment is provided with the power-assisted turbocharger 2 including the electric motor 5 that assists the drive force of the compressor 4, and the electric motor control unit 21 that drives the electric motor 5 when the accessory is being driven.

Therefore, for example, when it is expected that a shock load will be applied to the engine E due to construction work, the turbocharger 2 is rotated in advance by the electric motor 5, so that air can be fed to the engine E with a margin. Therefore, if fuel is injected when a shock load is actually applied, a large engine torque is instantaneously obtained, making it possible to prevent a drop in the rotation of the engine and improve a shock loading resistance.

Also, in the conventional engine system, if the displacement is reduced by engine downsizing, the rotation of the engine is rapidly decreased when a shock load is applied to the engine E, causing a problem that makes it difficult to operate the shovel or the like. However, according to the present invention, since the shock loading resistance can be improved, the occurrence of the above-described problem can be suppressed even though the displacement is reduced by engine downsizing. Therefore, additional engine downsizing is enabled, and the fuel efficiency can be further improved.

That is, according to the present invention, both of the improvement of the fuel efficiency by engine downsizing and the excellent shock loading resistance can be achieved.

Also, since power is consumed when the electric motor 5 is driven, the fuel efficiency is deteriorated to some degree. However, the effect of the high fuel efficiency by the engine downsizing is greater than the deterioration of the fuel efficiency by the driving of the electric motor 5. Also, in the power-assisted turbocharger 2, when there is sufficient exhaust energy, regenerative power can also be obtained by using the electric motor 5 as a generator.

It is apparent that the present invention is not limited to the above-described embodiments, and various modifications can be made without departing from the scope of the present invention.

The invention claimed is:

1. A turbocharger system for a vehicle having an engine, comprising:
    an accessory mechanically connected to and driven to move by the engine to perform work;
    a power-assisted turbocharger including a turbine disposed on an exhaust passage of the engine and driven by exhaust, a compressor disposed on an intake passage of the engine and driven by a rotational torque of the turbine, and an electric motor that assists a drive force of the compressor, wherein the turbocharger assists in powering the engine; and an electric motor control unit that continuously drives the electric motor in a running mode, where the electric motor is driven but the accessory is not driven, and in a driving mode, where the electric motor and the accessory are both driven.

2. The turbocharger system according to claim 1, further comprising a manual switch to change from the running mode to the driving mode so that the accessory is driven.

3. The turbocharger system according to claim 1, wherein the electric motor control unit drives the electric motor at a rotational speed corresponding to a speed of the engine.

4. The turbocharger system according to claim 2, wherein the electric motor control unit drives the electric motor at a rotational speed corresponding to a speed of the engine.

* * * * *